US012562391B2

(12) United States Patent
Ye et al.

(10) Patent No.: US 12,562,391 B2
(45) Date of Patent: Feb. 24, 2026

(54) CATALYTIC COMPOSITION, METHOD FOR PRODUCTION THEREOF, USE THEREOF FOR PRODUCING A FUEL CELL ELECTRODE AND FUEL CELL COMPRISING SAME

(71) Applicants: AUDI AG, Ingolstadt (DE); VOLKSWAGEN AG, Wolfsburg (DE)

(72) Inventors: Siyu Ye, Burnaby (CA); Kyoung Bai, Burnaby (CA); Dustin William H. Banham, Burnaby (CA); Rajesh Bashyam, Burnaby (CA); Alan Patrick Young, Burnaby (CA)

(73) Assignees: AUDI AG, Ingolstadt (DE); VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 16/639,095

(22) PCT Filed: Jul. 20, 2018

(86) PCT No.: PCT/EP2018/069730
§ 371 (c)(1),
(2) Date: Feb. 13, 2020

(87) PCT Pub. No.: WO2019/037974
PCT Pub. Date: Feb. 28, 2019

(65) Prior Publication Data
US 2020/0212452 A1 Jul. 2, 2020

(30) Foreign Application Priority Data
Aug. 23, 2017 (DE) .................... 10 2017 214 725.3

(51) Int. Cl.
*H01M 4/90* (2006.01)
*H01M 4/86* (2006.01)
*H01M 4/88* (2006.01)

(52) U.S. Cl.
CPC ....... *H01M 4/9083* (2013.01); *H01M 4/8668* (2013.01)

(58) Field of Classification Search
None
See application file for complete search history.

(56) References Cited

U.S. PATENT DOCUMENTS

| | | | |
|---|---|---|---|
| 818,026 | A | 4/1906 | Hawkins |
| 7,771,860 | B2 | 8/2010 | Son |

(Continued)

FOREIGN PATENT DOCUMENTS

| | | |
|---|---|---|
| CN | 1691383 A | 11/2005 |
| CN | 101626081 A | 1/2010 |

(Continued)

OTHER PUBLICATIONS

Mauritz et al., "State of Understanding of Nafion," *Chem. Rev.* *104*(10):4535-4585, Sep. 21, 2004. (53 pages).

*Primary Examiner* — Tracy M Dove
(74) *Attorney, Agent, or Firm* — Seed IP Law Group LLP

(57) ABSTRACT

A catalytic composition for producing a fuel cell electrode comprises a catalytically active material in particulate form, for example platinum, a carbon nanomaterial which is coated with a first ionomer, as well as a binding agent composition in which the catalytically active material and the coated carbon nanomaterial are present in dispersed form, wherein the binding agent composition comprises a second ionomer and the first and second ionomers are the same or different. The composition is used to produce a catalytic layer of a fuel cell electrode for a fuel cell.

11 Claims, 2 Drawing Sheets

(56) References Cited

U.S. PATENT DOCUMENTS

| | | | | |
|---|---|---|---|---|
| 2004/0185325 | A1 | 9/2004 | Faguy et al. | |
| 2005/0238948 | A1 | 10/2005 | Mei et al. | |
| 2010/0009240 | A1 | 1/2010 | Fly et al. | |
| 2012/0009503 | A1* | 1/2012 | Haug | H01M 8/1004 |
| | | | | 429/523 |
| 2013/0288152 | A1 | 10/2013 | Hasegawa | |
| 2016/0156054 | A1 | 6/2016 | Chuy et al. | |
| 2016/0285106 | A1 | 9/2016 | Madden et al. | |
| 2017/0365862 | A1 | 12/2017 | Yamasaki et al. | |
| 2018/0108919 | A1* | 4/2018 | Lu | H01M 8/1004 |
| 2018/0331368 | A1* | 11/2018 | Kongkanand | C08J 5/225 |

FOREIGN PATENT DOCUMENTS

| | | | |
|---|---|---|---|
| CN | 103329321 | A | 9/2013 |
| DE | 10 2010 028 242 | A1 | 6/2011 |
| EP | 2 882 017 | A1 | 6/2015 |
| JP | 2006228745 | A | 8/2006 |
| JP | 2006-286329 | A | 10/2006 |
| JP | 2008-052933 | A | 3/2008 |
| JP | 2009-211869 | A | 9/2009 |
| JP | 2011-142009 | A | 7/2011 |
| JP | 2012-123927 | A | 6/2012 |
| JP | 2017-041454 | A | 2/2017 |
| WO | 2012/026916 | A1 | 3/2012 |
| WO | 2016/157746 | A1 | 10/2016 |

* cited by examiner

CATALYTIC COMPOSITION, METHOD FOR PRODUCTION THEREOF, USE THEREOF FOR PRODUCING A FUEL CELL ELECTRODE AND FUEL CELL COMPRISING SAME

BACKGROUND

Technical Field

Embodiments of the invention relate to a catalytic composition for a fuel cell electrode, a method for the production thereof and the use thereof for producing a fuel cell electrode, such as a catalytically coated membrane or a gas diffusion electrode. Embodiments of the invention further relate to a fuel cell having a catalytic layer which can be produced from the catalytic composition.

Description of the Related Art

Fuel cells use the chemical conversion of a fuel with oxygen into water in order to generate electrical energy. For this purpose, fuel cells contain the so-called membrane electrode assembly (MEA) as a core component, which is an arrangement of an ion-conducting (often proton-conducting) membrane and of a catalytic electrode (anode and cathode), respectively arranged on both sides of the membrane. The latter generally comprise supported precious metals, such as platinum. In addition, gas diffusion layers (GDL) can be arranged on both sides of the membrane electrode assembly, on the sides of the electrodes facing away from the membrane. Generally, the fuel cell is formed by a plurality of MEAs arranged in a stack, the electrical power outputs of which add up. Between the individual membrane electrode assemblies, bipolar plates (also called flow field plates or separator plates) are usually arranged, which ensure a supply of the individual cells with the operating media, i.e. the reactants, and are usually also used for cooling. In addition, the bipolar plates also ensure an electrically conductive contact to the membrane electrode assemblies.

While the fuel cell is operating, the fuel (anode operating medium), such as hydrogen $H_2$ or a hydrogen-containing gas mixture, is supplied to the anode via an anode-side open flow field of the bipolar plate where electrochemical oxidation of $H_2$ into protons Et occurs with the release of electrons ($H_2 \rightarrow 2H^+ 2e^-$). Protons are transported (in a water-bound or water-free manner) from the anode chamber into the cathode chamber across the electrolyte or membrane that separates and electrically insulates the reaction chambers in a gas-tight manner from each other. The electrons provided at the anode are guided to the cathode via an electrical line. The cathode receives, as a cathode operating medium, oxygen or a gas mixture containing oxygen (such as air) via an open flow field of the bipolar plate on the cathode side so that a reduction of $O_2$ to $O^{2-}$ with gain of electrons takes place ($\frac{1}{2}O_2 + 2e^- \rightarrow O^{2-}$). At the same time, the oxygen anions in the cathode chamber react with the protons transported across the membrane to form water ($O^{2-} + 2H^+ \rightarrow H_2O$).

The catalytic electrodes in fuel cells are usually in the form of a catalytic coating. In the case of a coating on the polymer electrolyte membrane, it is also referred to as a catalyst-coated membrane (CCM). If the coating is arranged on a diffusion layer, the latter is also referred to as a gas diffusion electrode. The catalytic layer is generally applied as a suspension (catalyst ink) to the corresponding substrate which has the catalytically active material, i.e. the catalytic noble metal, which is supported on an electrically conductive carbon material. It is also known to add a polymeric ionomer to the suspension as a binding agent and to improve electron transport. After application to the substrate, the coating is dried so that the resulting catalyst layer (CL) consists of the supported catalytically active material and the ionomer.

US 2004/185325 A1 discloses a method for producing a fuel cell electrode in which the catalytically active material, carbon and an ionomer are co-deposited on a substrate from the gas phase. The substrate is either the polymer electrolyte membrane or a carbon support.

US 2016/156054 A1 describes a two-layer catalytic layer for a fuel cell, wherein a sublayer facing the diffusion layer consists of catalyst particles which are coated with a first ionomer and a connected sublayer close to the membrane consists of particles of a second ionomer.

US 818026 B2 describes the use of two ionomers of different equivalent masses in a fuel cell electrode.

EP 2882017 A1 describes the production of a fuel cell electrode wherein carbon nanotubes (CNTs) are grown on a substrate, a catalyst is deposited onto the CNTs, and the CNTs and the catalyst are then coated with an ionomer. The composition thus produced is transferred to a polymer electrolyte membrane so as to obtain a catalytically coated membrane (CCM).

U.S. Pat. No. 7,771,860 B2 discloses a catalyst composition for a fuel cell having a core shell structure. A carbon core is coated with a "shell" of particulate catalytic material bonded to the carbon core via an ionomer. This is produced by mixing the carbon particles, the catalytic material and the ionomer.

In addition, catalytic compositions for producing fuel cell electrodes are known, comprising a catalytically active material in particulate form supported on a carbon support, a carbon nanomaterial, and a binding agent composition in which the catalytically active material and the carbon nanomaterial are present in dispersed form, wherein the binding agent composition comprises an ionomer (WO 2016/157746 A1, DE 10 2010 028 242 A1, US 2010/0009240 A1, JP 2009-211869 A, JP 2008-052933 A).

EP 2 882 017 A1 discloses a catalytic layer of a fuel cell having a layer of carbon nanotubes (CNTs) grown on a substrate and transferred to a polymer electrolyte membrane, a catalytically active material in particulate form supported on the CNTs, and an ionomer that coats the CNTs with the catalytically active material.

Also described in WO 2012/026916 A1 is a catalytic layer of a fuel cell which has a catalytically active material which is supported on a support and is coated by means of an ionomer.

BRIEF SUMMARY

Embodiments of the invention provide a catalyst composition for a fuel cell electrode from which a catalytic layer can be produced which has improved proton conductivity, especially at low relative humidity contents. The high proton conductivity should ideally remain not only at the start of the service life, but also after prolonged operation of the fuel cell. A corresponding fuel cell electrode and fuel cell are also proposed.

The catalytic composition according to some embodiments of the invention for producing fuel cell electrodes comprises a catalytically active material in particulate form supported on a carbon support, a carbon nanomaterial coated with a first ionomer, and a binding agent composition comprising a second ionomer in which the catalytically active material and the coated carbon nanomaterial are present in dispersed form. The first and second ionomers may be the same or different.

It has been found that a catalytic layer produced from the catalytic composition according to embodiments of the invention has a higher proton conductivity compared to conventional catalytic layers which have an uncoated nanomaterial or no nanomaterial at all. In addition, the high proton conductivity is also maintained over a longer operating period of the fuel cell. Without wishing to be bound by any theory, it is believed that the ionomer-coated nanomaterial has two functions in a catalytic layer produced from the catalytic composition. On the one hand, it is assumed that the ionomer-coated nanomaterial functions like a proton-conducting bridge between the actual catalytic centers of the composition, the catalytically active material, and thus allows improved proton transport through the catalytic layer. Furthermore, the ionomer-coated nanomaterial appears to serve to maintain the structural integrity of the catalytic layer. Coating the carbon nanomaterial with the ionomer prevents the catalytic material, which is typically a noble metal, from coming into direct contact with the substantially less noble carbon. Thus, corrosion of the carbon nanomaterial caused by the different electrochemical potentials of carbon and the noble metal is prevented so that the function of the carbon nanomaterial is maintained over long operating periods.

An ionomer is understood to mean a polymer (macromolecule) whose constituent units have partly ionic or ionizable groups which are covalently bonded as side chains to the polymer backbone. This is usually a copolymer of electrical neutral constituent units and ionic or ionizable constituent units. In this case, the proportion of ionic/ionizable constituent units is usually lower than that of the neutral constituent units, and is typically 1 to 15 mol %, based on the total number of constituent units making up the ionomer.

The first ionomer encapsulating the carbon nanomaterial and the second ionomer of the binding agent composition may be the same or different. In one embodiment of the invention, the two ionomers are different, at least in relation to their equivalent masses. The proton conductivity and its long-term stability are further improved by the use of ionomers having different equivalent masses. The first ionomer may have a smaller equivalent mass (EW for equivalent weight) than the second ionomer. In one embodiment of the invention, the first ionomer encapsulating the carbon nanomaterial has an equivalent mass of less than 850. The equivalent mass EW is defined as the molecular mass of the ionomer per ionic or ionizable group, for example per sulfonic acid group. The equivalent mass EW can be determined as described in Mauritz et al. in the case of Nafion (Mauritz, K. A., Moore, R. B.: "State of Understanding of Nafion" Chemical Reviews 104 (10) (2004): 4535-4585).

An advantageous embodiment of the invention provides that the catalytically active material is supported (immobilized) on a carbon support. The carbon support serves on the one hand to electrically connect the catalytic material and on the other hand to provide a high specific surface area, which leads to a high accessibility of the catalytic centers. Furthermore, immobilization of the catalytically active material on the carbon support prevents the coalescence of the catalyst particles and the associated decrease in the electrocatalytic surface area. The carbon support and carbon nanomaterial may be the same or different. In this embodiment, the composition contains both the ionomer-coated carbon nanomaterial and the carbon support material loaded with the catalytically active material as independent non-interconnected components.

In addition to the second ionomer, the binding agent composition may contain other components, such as a solvent for the second ionomer.

An average layer thickness of the first ionomer on the carbon nanomaterial may be 5 to 20 nm, or 8 to 12 nm. As is known, the proton conductivity of ionomer layers strongly depends on their layer thicknesses, wherein the proton conductivity increases with lower layer thicknesses. The mentioned upper limits ensure on the one hand a continuous encapsulation of the nanomaterial by the second ionomer. On the other hand, the layer thicknesses are thin enough to ensure high proton conductivity.

Some embodiments of the invention further relate to a method for producing the catalytic composition described herein. The method may comprise:

(a) mixing a carbon nanomaterial with a first ionomer in a solvent and exposing the mixture to predetermined temperature and pressure conditions to form an ionomer-coated carbon nanomaterial; and (b) mixing the ionomer-coated carbon nanomaterial with a catalytically active material in particulate form and a binding agent composition comprising a second ionomer, wherein the first and second ionomers are the same or different.

The production method is thus a two-stage method, wherein the ionomer-coated carbon nanomaterial is produced in the first stage and the components of the composition are combined in the second stage. This two-stage method results in the described catalytic composition.

The temperature and pressure conditions used in stage (a) as well as the choice of solvent lead to a stable ionomer coating on the nanomaterial, which coating is also not dissolved in the binding agent composition of the subsequent step (b). The predetermined temperature conditions may comprise a temperature in the range from 40 to 150° C., such as in the range from 80 to 130° C., and/or the predetermined pressure conditions comprise a pressure in the range from ambient pressure to 1050 kPa. Under these conditions, a long-term stable coating of the first ionomer on the nanomaterial is achieved. Furthermore, an alcohol, for example an alkyl alcohol, such as methanol, ethanol, n-propanol or isopropanol, or water or a mixture of these may be used as the solvent in this step.

Optionally, a drying step may be performed between stages (a) and (b) to remove the solvent from stage (a) and dry the ionomer layer.

A further aspect of the invention relates to the use of the catalytic composition described herein to produce a catalytic layer of a fuel cell electrode. In particular, the fuel cell electrode is a catalytically coated membrane for a fuel cell, i.e. a polymer electrolyte membrane, which is coated at least on one side, or on both sides, with a catalytic layer of the composition. Alternatively, the fuel cell electrode is a gas diffusion electrode for a fuel cell, i.e. a gas-permeable gas diffusion layer, which is coated on one of its flat sides with a catalytic layer of the composition. The fuel cell electrode serves as an anode or cathode in the fuel cell. In embodiments, the catalytic layers of anode and cathode may differ from one another, such as in the choice of the catalytically active material.

The catalytic layer is produced by applying the catalytic composition to the corresponding substrate (polymer electrolyte membrane or gas diffusion layer) as a thin layer by means of any desired method comprising pouring, painting, spraying, dipping, knife coating and so forth. The layer is then dried to remove the solvent. Optionally, prior to drying, the fuel cell possibly coated membrane can be assembled with the possibly coated gas diffusion layer and only then can the drying process be carried out.

A further aspect of the invention relates to a fuel cell having a catalytic layer produced from a catalytic composition described herein.

Features and aspects of the various embodiments of the invention mentioned in this application may be combined advantageously with one another unless stated otherwise in individual cases.

BRIEF DESCRIPTION OF THE SEVERAL VIEWS OF THE DRAWINGS

Embodiments of the invention are explained below with reference to the respective drawings. The following is shown.

DETAILED DESCRIPTION

Figure 1:
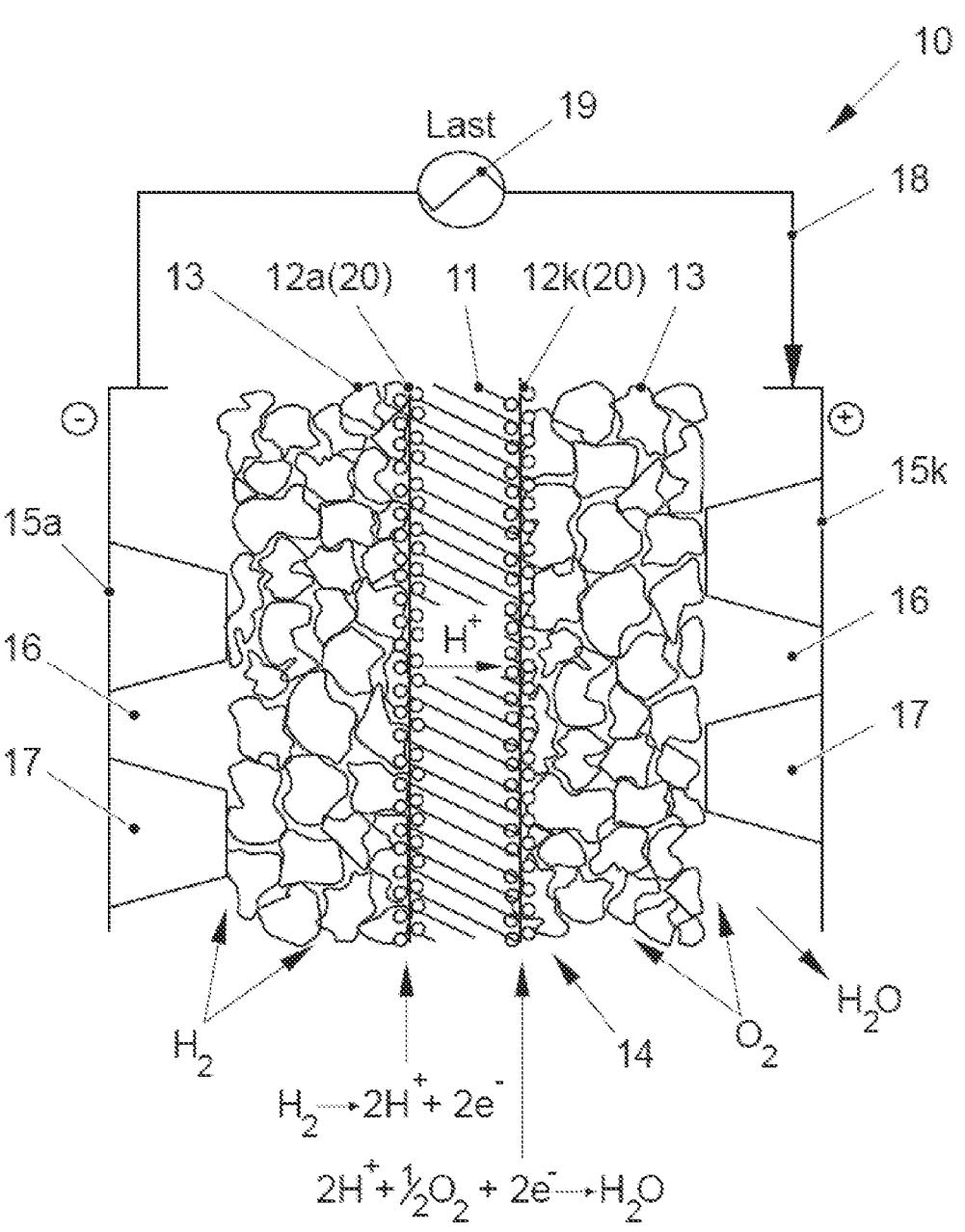
FIG. 1 shows a sectional view of a fuel cell with a catalyst material according to an embodiment of the invention.

FIG. 1 shows the structure of a fuel cell 10 in a schematic sectional view. The core piece of the fuel cell 10 is a membrane electrode assembly (MEA), designated overall by reference numeral 14. The MEA 14 comprises a polymer electrolyte membrane 11, two catalytic layers or catalytic coatings or catalytic electrodes 12 arranged on the flat sides thereof, namely an anode 12a and a cathode 12k, as well as two gas diffusion layers 13 arranged on both sides thereof. The polymer electrolyte membrane 11 is an ion-conducting polymer, such as proton-conducting polymer, for example a product marketed under the trade name Nafion®. The gas diffusion layers 13 consist of a gas-permeable, electrically conductive material which, for example, has the structure of a foam or a fiber structure or the like and serves to distribute the reaction gases to the catalytic layers 12a and 12k. The catalytic layers 12a, 12k are produced from the catalytic composition described herein and are designed as double-sided coatings of the membrane 11 in the illustrated example. Such a structure is also referred to as a CCM (catalyst coated membrane). Alternatively, the catalytic layers 12a, 12k can be designed as coatings of the gas diffusion layers 13 so that they are also called gas diffusion electrodes.

Bipolar plates 15, namely an anode plate 15a and a cathode plate 15k, are connected to the membrane electrode assembly 14 on both sides. Usually, a plurality of such individual cells 10 are stacked into a fuel cell stack so that each bipolar plate is composed of an anode plate 15a and a cathode plate 15k. The bipolar plates 15a, 15k each comprise a structure of reactant channels 16, which are open in the direction of the gas diffusion layers 13 and serve to supply and distribute the reactants of the fuel cell, and/or coolant channels 17. Thus, via the reactant channels 16 of the anode plate 15a, the fuel, here hydrogen H₂, is supplied and, via the corresponding channels 16 of the cathode plate 15k, oxygen O₂ or an oxygen-containing gas mixture, such as air, is supplied. The bipolar plates 15a, 15k are connected to one another and to an electrical load 19, for example a traction motor for an electric vehicle or a battery, via an external circuit 18.

During operation of the fuel cell 10, the hydrogen is supplied via the reactant channels 16 of the anode plate 15a, distributed across the gas diffusion layer 13 on the anode side and fed to the catalytic anode 12a. Here, a catalytic dissociation and oxidation of hydrogen H₂ into protons H⁺ takes place with release of electrons, which are discharged via the circuit 18. On the other hand, via the cathode plate 15k, the oxygen is conducted to the catalytic cathode 12k via the cathode-side gas diffusion layer 13. At the same time, the protons H⁺ formed on the anode side diffuse across the polymer electrolyte membrane 11 in the direction of the cathode 12k. In this case, the supplied atmospheric oxygen reacts on the catalytic noble metal with the protons while gaining the electrons supplied via the external circuit 18 to form water, which is discharged from the fuel cell 10 with the reaction gas. The electrical load 19 can be supplied by the electrical current flow thus generated.

The catalytic layer described herein may be used for the anode 12a and/or the cathode 12k of fuel cells. The fuel cell 10 equipped with the catalytic layer 12a, 12k described herein is distinguished by an improved proton transport through the catalytic layer 12a, 12k, in particular at low relative humidities. The good proton conductivity exists not only in the case of a new fuel cell but also over a long service life.

Figures 2, 3:
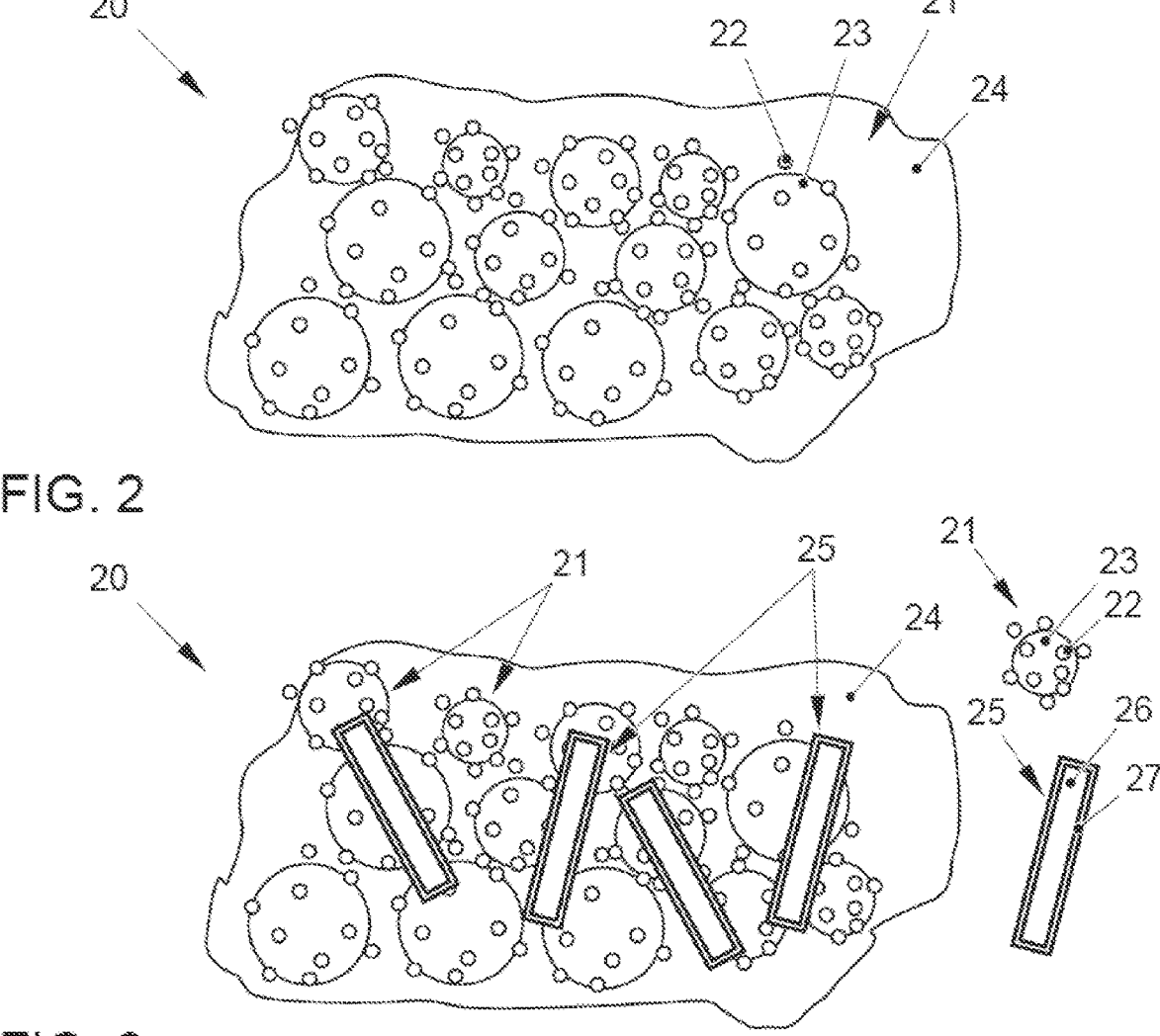
FIG. 2 shows a highly schematic representation of a catalytic composition for a fuel cell in accordance with the prior art.
FIG. 3 shows a highly schematic representation of a catalytic composition for a fuel cell according to an embodiment of the invention.

FIG. 2 shows a catalytic composition denoted overall by 20' for a fuel cell electrode according to the prior art. The composition 20' comprises a supported catalyst 21 comprising a carbon support 23 and a catalytically active material 22 immobilized (supported) thereon. The supported catalyst 21 is present in dispersed form in a binding agent composition 24 consisting substantially of an ionomer 24 and a solvent therefor.

One embodiment of a catalytic composition 20 according to the invention for a fuel cell electrode is shown in FIG. 3. The catalytic composition 20 again comprises a supported catalyst 21 comprising a carbon support 23 and a catalytically active material 22 immobilized (supported) thereon. The supported catalyst 21 is shown in isolation in the detailed representation in FIG. 3. The composition further comprises a carbon nanomaterial 26 coated with an ionomer (first ionomer) 27. This ionomer-coated carbon nanomaterial 25 is likewise shown in isolation in the detailed representation in FIG. 3. The supported catalyst 21 and the ionomer-coated carbon nanomaterial 25 are present in dispersed form in a binding agent composition 24 consisting substantially of an ionomer (second ionomer) 24 and a solvent therefor. The first and second ionomers may be the same or different.

The catalytically active material 22 of the composition 20 described herein represents the actual catalyst for the fuel cell reaction to be catalyzed at the anode or cathode. The catalytically active material 22 may comprise platinum (Pt) or a platinum alloy in which platinum is alloyed with ruthenium, iridium, rhodium, palladium, osmium, tungsten, lead, iron, chromium, cobalt, nickel, manganese, vanadium, molybdenum, gallium, aluminum, and combinations thereof.

The carbon nanomaterial 26 comprises any known nanostructure of carbon, such as carbon nanotubes (CNTs), carbon nanofibers (CNFs), carbon nanospheres, carbon nanohorns, carbon nanorings, graphite, carbon powders, such as carbon nanopowders, Vulcan, carbon black, acetylene black, activated carbon, fullerene, and mixtures thereof.

The carbon support 23 for the catalytically active material 22 may in principle be selected from the same materials mentioned for the carbon nanomaterial 26 or from other materials.

The first ionomer 27 and the second ionomer 24 are independently understood to be a polymer whose constituent units have partly ionic or ionizable groups, such as carboxyl and/or sulfonic acid groups, which are covalently bonded as side chains to the polymer backbone. It may be a copolymer of electrical neutral constituent units and ionic/ionizable constituent units. For example, the first and/or second ionomer 27, 24 are based on fluoro-based polymers, benzimidazole-based polymers, polyimide-based polymers, polyetherimide-based polymers, polyphenylene sulfide-based polymers, polysulfone-based polymers, polyether-sulfone-based polymers, polyether-ketone-based polymers, polyether-etherketone-based polymers, and polyphenylquinoxaline-based polymers or their constitution units. Specific examples are poly(perfluorosulfonic acid), poly(perfluorocarbonic acid), copolymers of tetrafluoroethylene and fluorovinyl ether with sulfonic acid groups, fluorinated polyether ketone sulfide, aryl ketone, poly(2,2'-(m-phenylene)-5,5'-bibenzimidazole), and poly(2,5-benzimidazole).

The catalytic composition described herein may be produced in a two-stage method in which, in the first stage, the carbon nanomaterial 26 is coated with a solution of the first ionomer 27 to obtain the ionomer-coated carbon nanomaterial 25 and optionally dried. In a second stage, the ionomer-coated carbon nanomaterial 25 thus produced is mixed in one step or successively with the (optionally supported) catalytically active material 22 and with the binding agent composition comprising a solution of the second ionomer 24. If an already supported catalytically active material 22 is employed, a composition in accordance with FIG. 3 is obtained which contains the ionomer-coated carbon nanomaterial 25 and the supported catalytically active material 21 as independent solid components dispersed in the binding agent composition 24.

In order to produce a catalytic layer 12a, 12k (see FIG. 1) from the catalytic composition as described herein, it is applied to the corresponding substrate, such as to the membrane 11 or the diffusion layers 13, as a thin layer using a suitable method, dried and the components are assembled to form the fuel cell 10. Optionally, the drying can also take place only after the assembly.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a catalytic composition, comprising:
   a first stage of forming an ionomer-encapsulated carbon nanomaterial that is free of noble metal catalytically active material, the first stage including mixing a carbon nanomaterial with a first ionomer having a first equivalent mass in a solvent and exposing the mixture to predetermined temperature and pressure conditions to form the ionomer-encapsulated carbon nanomaterial;
   drying the ionomer-encapsulated carbon nanomaterial; and
   a second stage of mixing components of the catalytic composition, including mixing the ionomer-encapsulated carbon nanomaterial with noble metal catalytically active material in particulate form and a binding agent composition that comprises a second ionomer having a second equivalent mass greater than the first equivalent mass of the first ionomer of the ionomer-encapsulated carbon nanomaterial, wherein the first equivalent mass of the first ionomer of the ionomer-encapsulated carbon nanomaterial is less than the second equivalent mass of the second ionomer, and wherein the noble metal catalytically active material and the ionomer-encapsulated carbon nanomaterial are independent components in the binding agent composition.

2. The method according to claim 1, wherein the predetermined temperature conditions comprise a temperature in the range of 40 to 150° C.

3. The method according to claim 1, wherein the predetermined pressure conditions comprise a pressure in the range of ambient pressure to 1050 kPa.

4. The method according to claim 1, wherein the solvent is an alcohol, water, or a mixture of alcohol and water.

5. A method, comprising:
   producing the catalytic composition according to claim 1; and
   producing a catalytic layer of a fuel cell electrode using the catalytic composition.

6. The method according to claim 1, wherein the first ionomer has an equivalent mass smaller than 850.

7. The method according to claim 1, wherein the ionomer-encapsulated carbon nanomaterial has an average layer thickness of the first ionomer on the carbon nanomaterial of 8 to 12 nm.

8. The method of claim 1, wherein the ionomer-encapsulated carbon nanomaterial has an average layer thickness of the first ionomer on the carbon nanomaterial of 5 to 20 nm.

9. The method of claim 1, wherein the noble metal catalytically active material is supported on a carbon support.

10. The method of claim 9, wherein the carbon support is made of a carbon nanomaterial.

11. The method of claim 10, wherein the binding agent composition comprising the second ionomer, coats the noble metal catalytically active material that is supported on the carbon support and coats the ionomer-encapsulated carbon nanomaterial.

* * * * *